US012013048B2

(12) United States Patent
Chapman

(10) Patent No.: US 12,013,048 B2
(45) Date of Patent: Jun. 18, 2024

(54) ROTARY DISC VALVE

(71) Applicant: Robert Bosch GmbH, Stuttgart (DE)

(72) Inventor: Thomas Chapman, Templeton, MA (US)

(73) Assignees: Robert Bosch LLC, Farmington Hills, MI (US); Robert Bosch GmbH, Stuttgart (DE)

( * ) Notice: Subject to any disclaimer, the term of this patent is extended or adjusted under 35 U.S.C. 154(b) by 9 days.

(21) Appl. No.: 17/551,859

(22) Filed: Dec. 15, 2021

(65) Prior Publication Data

US 2023/0184338 A1 Jun. 15, 2023

(51) Int. Cl.
*F16K 3/08* (2006.01)
*F16K 11/074* (2006.01)
*F16K 11/085* (2006.01)

(52) U.S. Cl.
CPC .............. *F16K 3/08* (2013.01); *F16K 11/074* (2013.01); *F16K 11/085* (2013.01); *Y10T 137/86863* (2015.04); *Y10T 137/86871* (2015.04)

(58) Field of Classification Search
CPC ........ F16K 3/08; F16K 11/074; F16K 11/085; Y10T 137/86863; Y10T 137/86871
See application file for complete search history.

(56) References Cited

U.S. PATENT DOCUMENTS

| | | | | |
|---|---|---|---|---|
| 3,385,321 A | * | 5/1968 | Ehrens | F16K 11/0743 251/188 |
| 3,863,675 A | * | 2/1975 | Wiltshire | F16K 11/074 137/625.46 |
| 3,911,956 A | * | 10/1975 | LeBreton | F16K 11/0743 210/411 |
| 5,244,013 A | * | 9/1993 | Gagas | C02F 1/42 251/249 |
| 5,848,610 A | * | 12/1998 | Livernash | F16K 11/072 137/625.46 |
| 6,085,788 A | | 7/2000 | Larson et al. | |
| 6,173,743 B1 | * | 1/2001 | Ibanez Sapina | F16K 11/074 137/625.46 |
| 6,186,174 B1 | * | 2/2001 | Yurchision | F16K 3/10 137/625.46 |
| 6,776,189 B1 | * | 8/2004 | Wang | F16K 11/074 137/625.46 |
| 7,004,197 B2 | | 2/2006 | Gilbert | |

(Continued)

OTHER PUBLICATIONS

EP Search Report for EP application No. EP22211908.3.

*Primary Examiner* — Matthew W Jellett
*Assistant Examiner* — Christopher D Ballman
(74) *Attorney, Agent, or Firm* — Kelly McGlashen; Maginot, Moore & Beck, LLP

(57) ABSTRACT

A rotary disc valve is used in a fluid delivery system to control flow of fluid between multiple ports. The valve may include a valve body having multiple ports that are connected to the system. In addition, the valve may include a diverter and seal assembly that are disposed in the valve body. The diverter is configured to rotate about a rotational axis and to control fluid flow through the valve body. The valve is free of an axial compression spring, and the valve body, the lid and the diverter are shaped and dimensioned so that an interference fit exists between the lid and the diverter that results in compression of the seal assembly between the diverter and the base.

20 Claims, 9 Drawing Sheets

(56) References Cited

U.S. PATENT DOCUMENTS

| | | | | |
|---|---|---|---|---|
| 7,255,130 B2* | 8/2007 | Martins | ............. | B60H 1/00485 |
| | | | | 137/625.46 |
| 7,779,865 B2* | 8/2010 | Shay | ........................ | F16K 3/04 |
| | | | | 137/454.6 |
| 9,410,628 B2* | 8/2016 | Bachofer | ................... | F16K 1/32 |
| 9,638,340 B2* | 5/2017 | Bachofer | ............ | F16K 11/0743 |
| 9,803,759 B2* | 10/2017 | Bachofer | .............. | E04F 13/148 |
| 9,803,760 B2* | 10/2017 | Morein | ............... | F16K 11/0853 |
| 9,874,284 B2* | 1/2018 | Bachofer | ............ | F16K 11/0746 |
| 10,344,877 B2* | 7/2019 | Roche | .................... | B60L 58/26 |
| 11,168,797 B2* | 11/2021 | Dragojlov | ............. | F16K 31/535 |
| 2001/0035218 A1* | 11/2001 | Ibanez Sapina | ...... | F16K 11/074 |
| | | | | 137/625.11 |
| 2004/0123911 A1* | 7/2004 | Bartkus | ............... | F16K 11/0743 |
| | | | | 137/625.46 |
| 2006/0231146 A1* | 10/2006 | Lillback | .............. | F16K 11/0853 |
| | | | | 137/625.47 |
| 2006/0245956 A1* | 11/2006 | Lacroix | .................... | H02K 7/14 |
| | | | | 417/423.1 |
| 2008/0258093 A1 | 10/2008 | Shay et al. | | |
| 2012/0248203 A1 | 10/2012 | Kim et al. | | |
| 2014/0124193 A1* | 5/2014 | Rowe | .................. | E21B 33/1212 |
| | | | | 166/115 |
| 2017/0159841 A1 | 6/2017 | Zhang et al. | | |

* cited by examiner

ROTARY DISC VALVE

BACKGROUND

A rotary valve is a type of directional control valve that may be used in a fluid delivery system to control fluid flow and distribution through the system. For example, rotary valves may be used to control the flow of coolant through a vehicle cooling system. The rotary valve may include a valve body that defines several ports and a diverter that is disposed in the valve body. The diverter is shaped to distribute the flow to predetermined ports for certain rotational orientations of the diverter within the valve body and is rotated relative to the valve body to control flow through the valve. Rotary valves often use an elastomer part to provide a fluid tight seal between the diverter and the valve body. However, elastomers have higher friction factors and result in higher required torque to turn the rotary valve than other materials commonly used in the rotary valve. While some other rotary valves may use low-friction plastic materials at the seal interface, such rotary valves typically include diverters that are cylindrical in shape, resulting in higher operating torque and less flexibility in the placement and orientation of the inlet and outlet valve ports. Still other rotary valves use a disc-shaped diverter, but typically use ceramic materials for the sealing components, incurring higher costs. Regardless of diverter shape, many valves use a spring element to provide the required loading of the sealing surfaces. It is desirable to provide a rotary valve that provides required fluid sealing while omitting the spring element in order to reduce valve complexity, materials costs and assembly costs while improving valve durability.

SUMMARY

Complex fluid delivery systems may require a rotary disc valve that is capable of controlling fluid flow between three, four, five or more individual ports of the valve body. For example, a multi-port rotary disc valve may be used in a cooling system of an electric vehicle to control flow of coolant fluid between a radiator, an electric drive motor, a battery, vehicle electronics, and one or more bypass lines. The rotary disc valve may include a valve body that has ports that are irregularly spaced along a circumference of the valve body. In addition, the rotary disc valve may include a disc-type diverter that is disposed in the valve body and is rotatable relative to the valve body about a rotational axis that is typically perpendicular to the plane in which the ports reside. The diverter is generally disc shaped and includes an outer surface from which a shaft protrudes. The diverter outer surface is opposite a diverter seal surface via which the diverter forms a seal with the valve body. The diverter has a three-dimensional shape that allows the working fluid to pass on either side of it. More particularly, the diverter is configured to control fluid flow through the valve body in such a way that fluid enters the diverter from the seal surface side and in a first direction that is parallel to the shaft rotational axis. Fluid exits the diverter in a second direction that is parallel to the rotational axis, the second direction being opposite the first direction. Between entering and exiting the diverter, fluid flows over a portion of the diverter outer surface.

The shape of the diverter is such that the diverter provides one fluid flow path via a closed passageway that protrudes from the diverter outer surface and provides another fluid flow path that permits fluid flow through openings in the diverter and is constrained only by the valve body.

The diverter seal surface may be planar (e.g., flat or level and smooth, without raised areas, protrusions, recesses, indentations or surface features or irregularities) and may interface with a facing flat surface of a stationary, thin seal plate. The seal plate is part of a seal assembly that includes the seal plate and an elastic element. The seal plate may be constricted from a plastic that has low friction and highly wear resistive properties. The seal plate is thin to provide flexibility that allows the wear plate to conform to any irregularities in the flat seal surface of the diverter. The seal plate is backed by the stationary elastic element. The elastic element provides elasticity, biases the seal plate toward the diverter seal surface, and allows the thin seal to conform to the flat seal surface of the diverter. The elastic element also provides a static seal between the seal plate and the valve housing. As used herein, the term "static seal" refers to a seal in which the elements constituting the seal are stationary or fixed in place. The term "dynamic seal" refers to a seal in which the elements constituting the seal are capable of relative movement. In this rotary disc valve, a dynamic seal exists between the seal plate and the diverter seal surface, whereas stationary seals exist between the seal plate and the elastic element, and between the elastic element and the valve body.

The rotary disc valve does not include a spring that applies axial force to the diverter for the purpose of biasing the diverter toward the seal assembly in order to ensure fluid tight sealing by the seal assembly. Instead, in order to ensure adequate sealing function, the rotary valve is configured so that loading of the sealing surfaces is achieved through an interference fit between the lid of the valve housing and the diverter. In particular, the interference fit between the lid and the diverter results in compression of the elastic element and loading of sealing surfaces of the seal plate and the diverter. The rotary valve is configured so that the interference fit between the lid and the diverter reliably achieves proper sealing over the entire operating temperature range and over the operating lifetime of the rotary valve.

In some aspects, a valve includes a valve body having a sidewall, a base that closes one end of the sidewall, and valve ports. Each valve port defines an opening in the sidewall. The valve includes a lid that closes an end of the sidewall that is opposite the base, the lid comprising a central opening. The lid, the sidewall and the base cooperate to define a chamber. The valve includes a diverter disposed in the chamber, the diverter configured to control fluid flow through the valve body. The diverter includes a diverter sealing surface that faces toward the base, a diverter outer surface that is opposed to the diverter sealing surface and faces the lid, and diverter through openings that extend between the diverter sealing surface and the diverter outer surface. In addition, the diverter includes a shaft that protrudes from the diverter outer surface in a direction perpendicular to the diverter sealing surface, the shaft extending through the central opening and configured to be connected to an actuator that drives the diverter to rotate about a rotational axis. The valve includes a seal assembly disposed in the chamber between the diverter sealing surface and the base. The valve body, the lid and the diverter are shaped and dimensioned so that an interference fit exists between the lid and the diverter that results in compression of the seal assembly between the diverter and the base.

In some embodiments, the valve is free of an elastic element between the lid and the diverter that is configured to compress the seal assembly between the base and the diverter.

In some embodiments, the lid includes a concave portion, and a lip that protrudes radially outward from a periphery of the concave portion. In addition, a periphery of the diverter includes a diverter flange that abuts the lip in such a way as to provide the interference fit between the lid and the diverter.

In some embodiments, the lip includes an inner portion that adjoins the concave portion, and an outer portion that includes a peripheral edge of the lid. The inner portion abuts the diverter flange, and the outer portion abuts an end of the sidewall.

In some embodiments, an axial dimension of the inner portion is different than an axial dimension of the outer portion.

In some embodiments, the lid includes a concave portion, a lip that protrudes outward from a periphery of the concave portion, and a gusset that extends between an outer surface of the concave portion and the lip.

In some embodiments, the seal assembly is fixed relative to the base and prevents fluid flow between the diverter and the valve body and between abutting portions of the diverter sealing surface and the seal sealing surface.

In some embodiments, the seal assembly comprises a first sealing element stacked with a second sealing element in a direction parallel to the rotational axis.

In some embodiments, the seal assembly includes a first sealing element and a second sealing element. The first sealing element is disposed between the diverter and the base. The first sealing element includes a seal sealing surface that faces toward the diverter sealing surface and is a first material. The second sealing element is disposed between the first sealing element and the base. The second sealing element includes a seal outer surface that is opposed to the seal sealing surface and faces toward the base. The second sealing element is a second material. In addition, the seal assembly includes seal through openings that extend between the seal sealing surface and the seal outer surface. The second material has greater elasticity than the first material.

In some embodiments, the diverter is configured to control fluid flow through the valve body in such a way that a) fluid enters the diverter via at least one diverter through opening in a first direction that is parallel to the rotational axis, and b) fluid exits the diverter via at least one diverter through opening in a second direction that is parallel to the rotational axis, the second direction being opposite the first direction.

In some embodiments, the diverter is configured to control fluid flow through the valve body in such a way that, between entering and exiting, fluid flows over a portion of the diverter outer surface.

In some embodiments, the seal assembly includes a first sealing element disposed between the diverter and the base and a second sealing element disposed between the first sealing element and the base. In addition, the valve includes a first static seal formed between the first sealing element and the second sealing element, a second static seal formed between the second sealing element and the base, and a dynamic seal formed between the first sealing element and the diverter.

In some embodiments, the diverter sealing surface is a planar surface that confronts and directly contacts under axial load a planar surface of the first sealing element, thereby realizing the dynamic seal.

In some embodiments, the seal assembly includes a first seal subassembly disposed between the diverter and the base and a second seal subassembly disposed between the first seal subassembly and the base. The second seal subassembly is in a stacked configuration with respect to the first seal subassembly. The first seal subassembly includes a first elastic element disposed between the diverter and the base and a first seal plate disposed between the first elastic element and the base. The second seal subassembly includes a second seal plate disposed between the first seal subassembly and the base and a second elastic element disposed between the second seal plate and the base. In addition, a dynamic seal is disposed between abutting surfaces of the first seal plate and the second seal plate.

In some aspects, a valve includes a valve body having a sidewall, a base that closes one end of the sidewall and valve ports. Each valve port defines an opening in the sidewall. The valve includes a lid that closes an open end of the sidewall, the lid, the sidewall and the base cooperating to define a chamber. The valve includes a diverter that is disposed in the chamber. The diverter is configured to control fluid flow through the valve body. The diverter includes a diverter sealing surface that faces toward the base, a diverter outer surface that is opposed to the diverter sealing surface and faces the lid, diverter through openings that extend between the diverter sealing surface and the diverter outer surface, and a shaft that protrudes from the diverter outer surface in a direction perpendicular to the diverter sealing surface. The shaft extends through the central opening and is configured to be connected to an actuator that drives the diverter to rotate about a rotational axis. The valve includes a seal assembly that is disposed in the chamber between the diverter sealing surface and the base. The lip contacts the diverter in such a way that an axial load is applied to the diverter, and the axial load results in compression of the seal assembly between the diverter and the base.

In some embodiments, the lid includes a concave portion, and a lip that protrudes radially outward from a periphery of the concave portion. In addition, a periphery of the diverter includes a diverter flange that abuts the lip in such a way as to provide an interference fit between the lid and the diverter.

In some embodiments, the seal assembly includes a first sealing element disposed between the diverter and the base; and a second sealing element disposed between the first sealing element and the base. In addition, the valve includes a first static seal formed between the first sealing element and the second sealing element, a second static seal formed between the second sealing element and the base, and a dynamic seal formed between the first sealing element and the diverter.

In some embodiments, the diverter sealing surface is a planar surface that confronts and directly contacts under the axial load a planar surface of the first sealing element, thereby realizing the dynamic seal.

In some embodiments, the seal assembly includes a first seal subassembly disposed between the diverter and the base and a second seal subassembly disposed between the first seal subassembly and the base. The second seal subassembly is in a stacked configuration with respect to the first seal subassembly. The first seal subassembly includes a first elastic element disposed between the diverter and the base and a first seal plate disposed between the first elastic element and the base. The second seal subassembly includes a second seal plate disposed between the first seal subassembly and the base and a second elastic element disposed between the second seal plate and the base. In addition, a dynamic seal is disposed between abutting surfaces of the first seal plate and the second seal plate.

DETAILED DESCRIPTION

Figure 1:
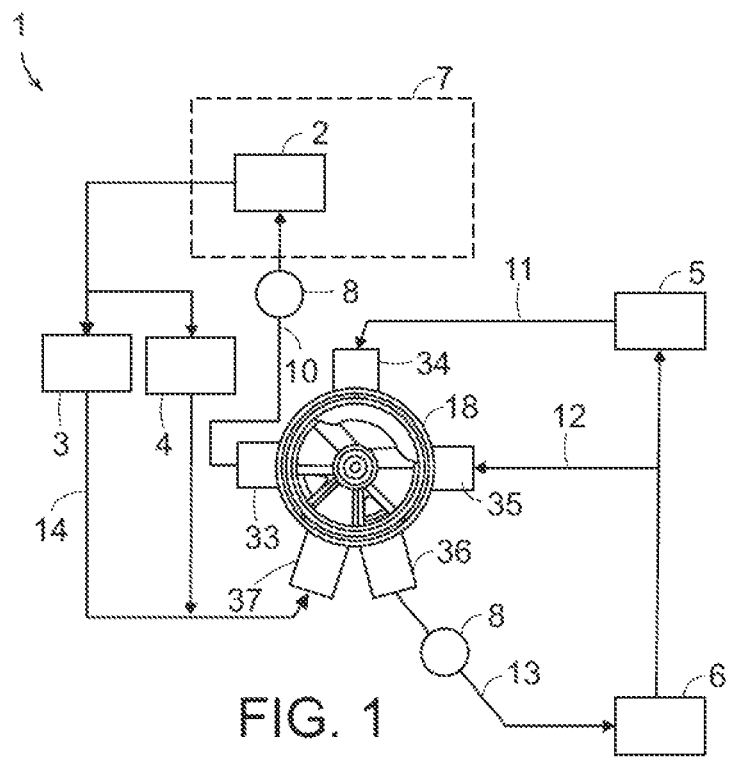
FIG. 1 is a schematic of a vehicle cooling system including a single-level, multi-port rotary disc valve.
Figure 2:
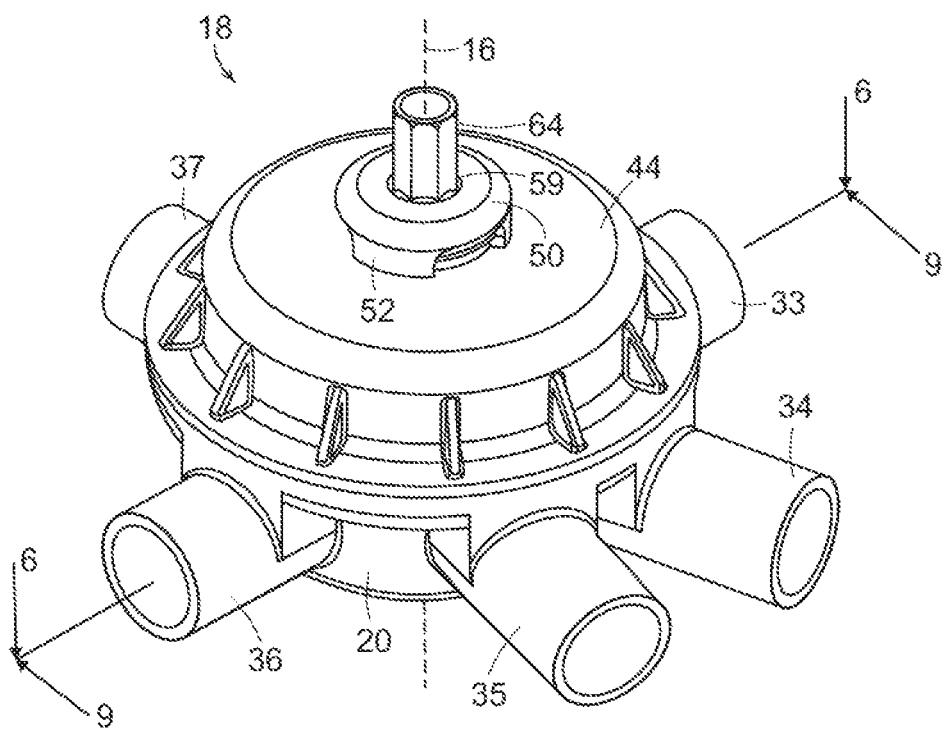
FIG. 2 is a perspective view of the rotary disc valve.
Figure 3:
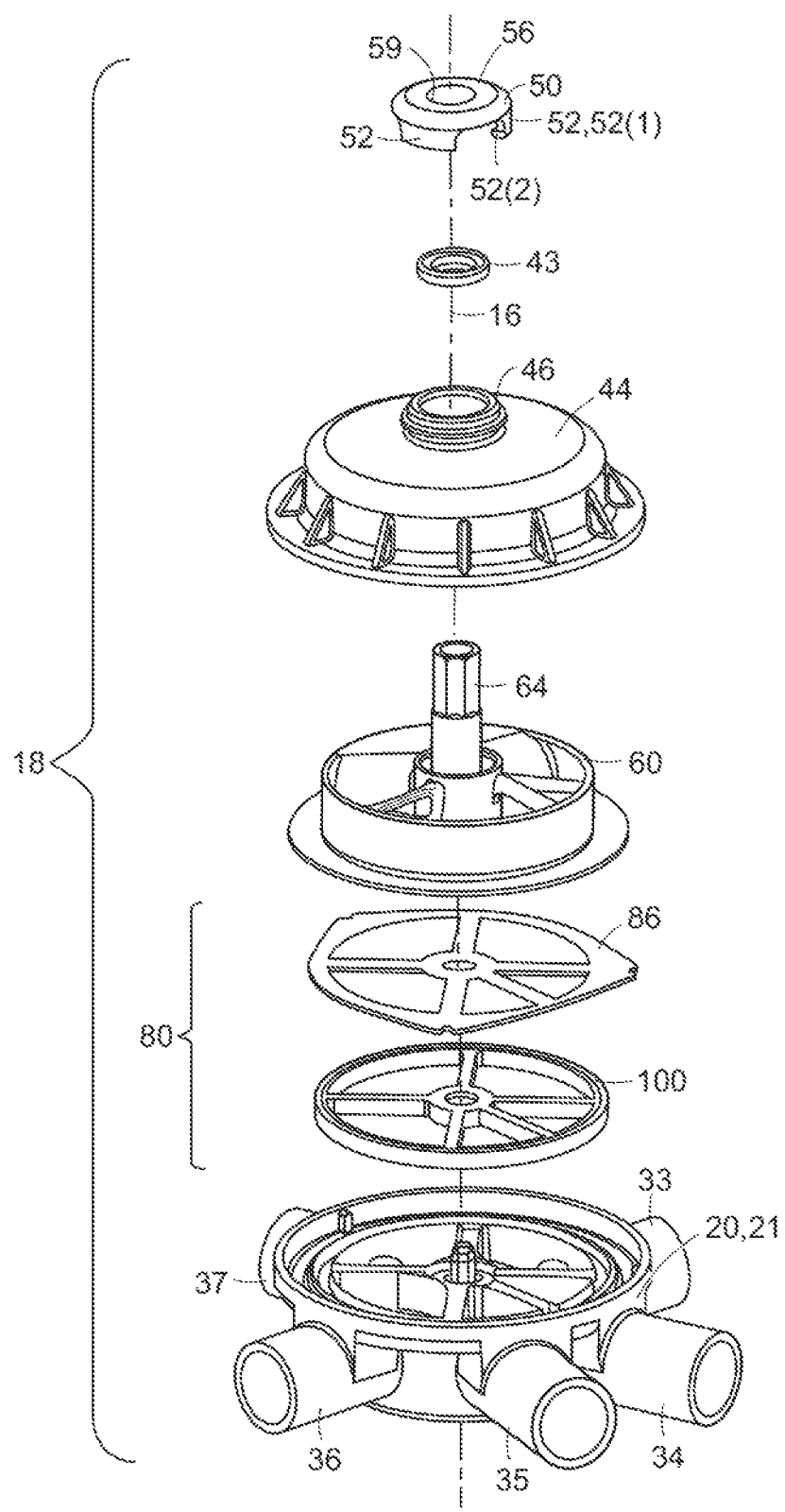
FIG. 3 is an exploded perspective view of the rotary disc valve.
Figure 4:
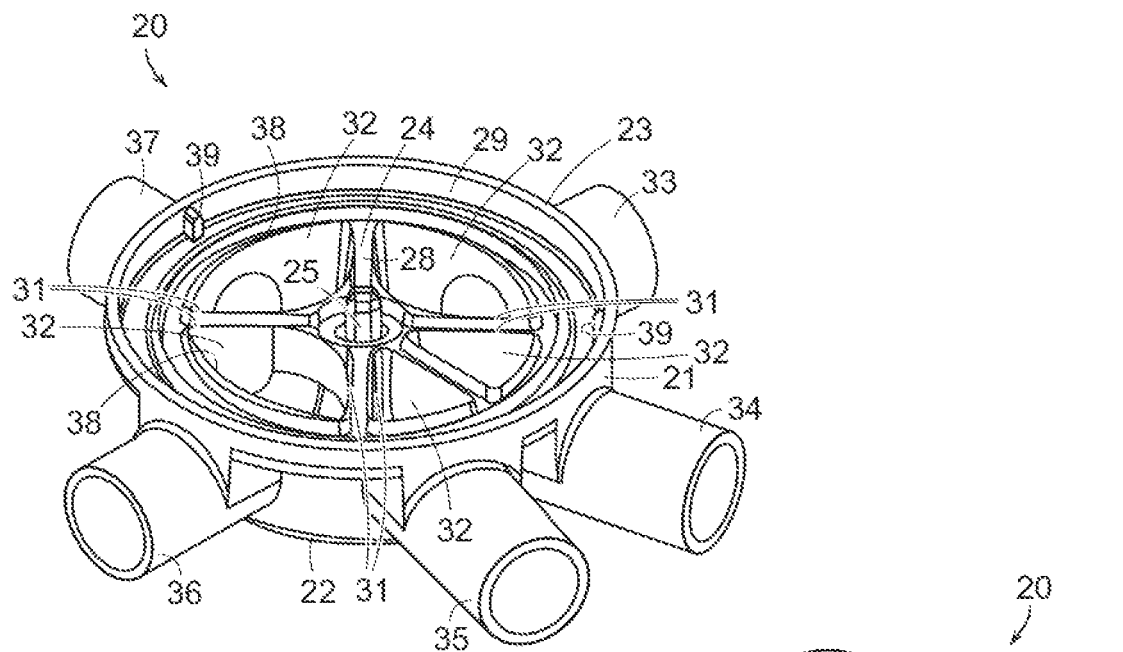
FIG. 4 is a top perspective view of the valve body.
Figure 5:
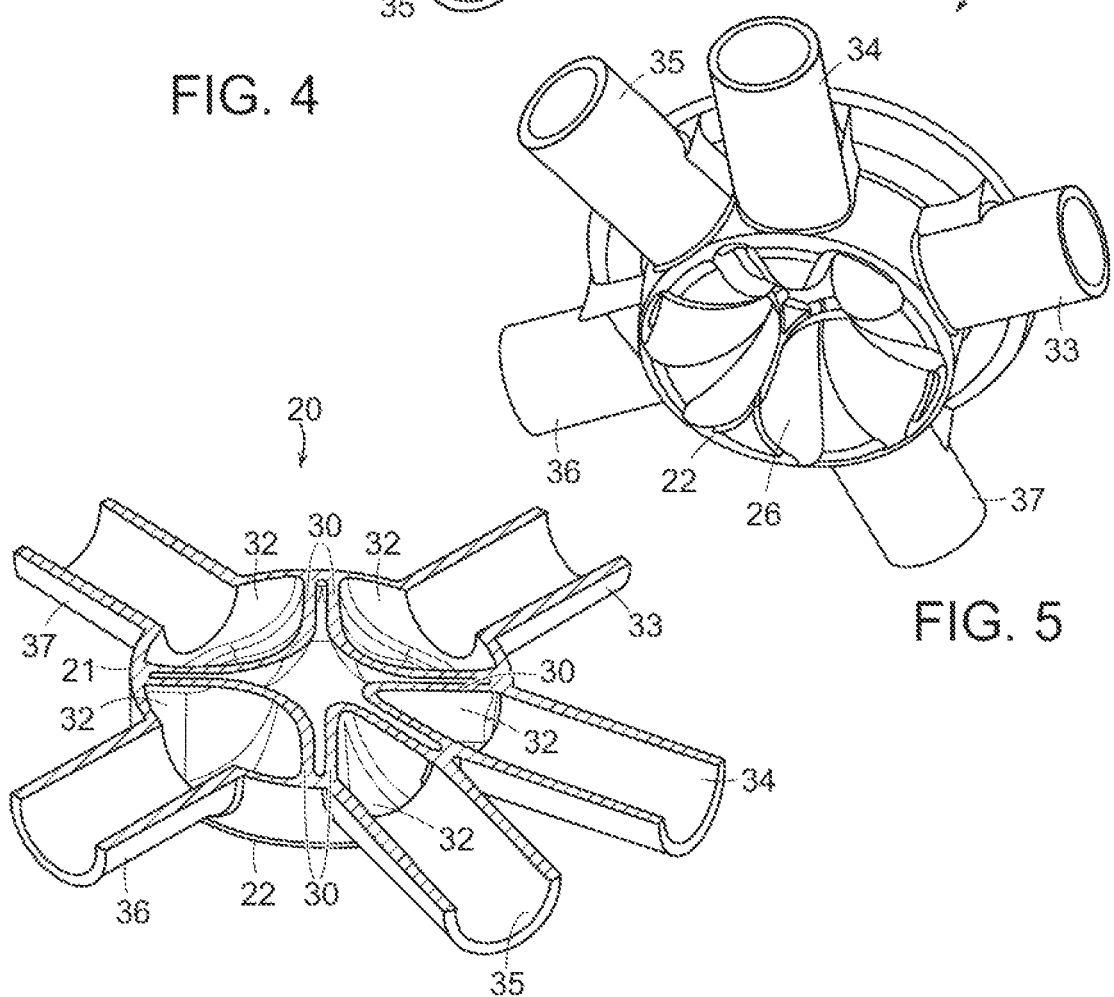
FIG. 5 is a bottom perspective view of the valve body.
Figure 6:
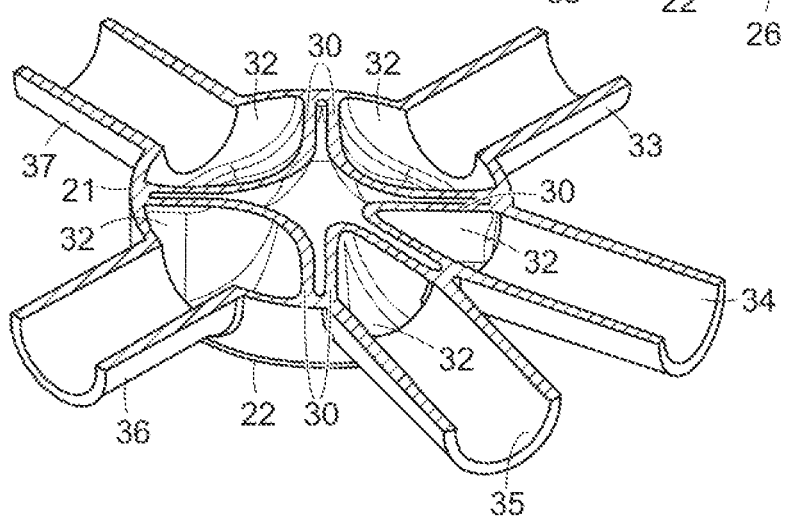
FIG. 6 is a cross-sectional view of the valve body as seen along line 6-6 of FIG. 2.

Referring to FIGS. 1-3, a fluid delivery system 1 includes a multi-port rotary disc valve 18 that is capable of controlling fluid flow driven by pumps 8 between three, four, five or more individual fluid lines 10, 11, 12, 13, 14 within the system 1. The rotary disc valve 18 may be used, for example, to control the distribution and flow of coolant in a cooling system 1 of an electric vehicle. In this example, the rotary disc valve 18 may control flow of coolant fluid between the rotary disc valve 18 and a radiator 2 that is part of a vehicle passenger cabin heating and cooling system 7, where coolant from the radiator 2 may also cool a battery 3 and battery management system 4. In addition, the rotary disc valve 18 may control fluid flow to heat exchangers 5, 6 that support temperature control of other vehicle devices and systems, such as an electric drive motor, vehicle electronics and/or electronic control units and/or the oil supply. The rotary disc valve 18 includes a valve body 20 and a diverter 60 that is disposed in the valve body 20. The diverter 60 includes a valve shaft 64 that protrudes through a lid 44 that closes an open end of the valve body 20. The valve shaft 64 is configured to be connected to a valve actuator (not shown). Upon actuation, the valve shaft 64 and the diverter 60 rotate relative to the valve body 20 about a rotational axis 16, and the rotational orientation of the diverter 60 relative to the valve body 20 is set via the valve actuator. In addition, the rotary disc valve 18 has a seal assembly 80 that provides a fluid-tight seal between the valve body 20 and the diverter 60. The valve body 20 includes multiple valve ports 33, 34, 35, 36, 37, the number of valve ports being determined by the specific application. The rotational orientation of the diverter 60 relative to the valve body 20 determines one or more fluid flow paths through corresponding ones of the valve ports 33, 34, 35, 36, 37, whereby the distribution of coolant fluid in the coolant system 1 is controlled. Details of the rotary disc valve 18, including the valve body 20, the diverter 60 and the seal assembly 80, will now be described.

Referring to FIGS. 2-6 and 9-10, the valve body 20 includes a sidewall 21, and a base 26 that closes one end (referred to here as the "base end") 22 of the sidewall 21. The sidewall 21 is a revolved section and has a circular profile when viewed in a direction parallel to the rotational axis 16. Although the sidewall 21 as illustrated is generally cylindrical, it could alternatively be, for example, conical or ellipsoidal. The sidewall 21 is joined at the base end 22 to a peripheral edge of the base 26, and the sidewall 21 surrounds the base 26. The sidewall 21 and the base 26 form a generally cup-shaped structure that, together with the lid 44 (described below), defines a valve chamber 29 therein.

The valve body 20 includes chamber walls 30 that segregate the lower portion of the valve body 20 into subchambers 32. One valve port 33, 34, 35, 36, 37 communicates with each subchamber 32, and each subchamber 32 is isolated from the other subchambers 32. The chamber walls 30 have exposed ends 31 that are spaced apart from the base 26 and intersect the sidewall 21. The exposed ends 31 of the chamber walls 30 are aligned with a first plane 40 (FIG. 9) that is perpendicular to the rotational axis 16 and intersects the sidewall 21 at an axial location between the sidewall open end 23 and the valve ports 33, 34, 35, 36, 37. For each valve port, the exposed end 31 of the corresponding chamber wall 30 defines a subchamber axial opening 38, also referred to as the "non-valve port opening" of the corresponding subchamber 32.

The valve body 20 includes a platform 24 that protrudes inward from an inner surface of the sidewall 21 and extends between adjacent pairs of chamber walls 30. The platform 24 is axially located between the sidewall base end 22 and the first plane 40 so as to be closely adjacent to, and recessed relative to, the chamber wall exposed ends 31. The platform 24 and the chamber wall exposed ends 31 cooperate to provide a wide, shallow platform channel 28 that receives and supports the seal assembly 80, as discussed further below.

The valve body 20 includes a post 25 that protrudes axially from the platform 24 toward the sidewall open end 23. The post 25 is coaxial with the rotational axis 16 and has a polygonal profile when viewed in a direction parallel to the rotational axis 16. In the illustrated embodiment, the post 25 has a pentagonal cross-sectional shape when viewed in a direction parallel to the rotational axis 16. The post 25 acts as an assembly aid and prevents rotation of portions of the seal assembly 80 with respect to the valve body 20. The post 25 is received in central openings 91, 105 of the first and second sealing elements 86, 100 of the seal assembly 80, which each have a corresponding cross-sectional shape, as discussed in detail below.

The valve body 20 includes sidewall ribs 39 that protrude inward from inner surface of the sidewall 21. The sidewall ribs 39 are spaced apart along an inner circumference of the sidewall 21. The sidewall ribs 39 extend axially, beginning at the platform 24, and terminating at a location that is spaced apart from the sidewall open end 23. The sidewall ribs 39 are configured to engage with a portion of the seal assembly 80, as discussed further below.

In the illustrated embodiment, the valve body 20 includes five valve ports 33, 34, 35, 36, 37, but is not limited to this number of valve ports. In particular, the valve body 20 includes a first valve port 33, a second valve port 34, a third valve port 35, a fourth valve port 36 and a fifth valve port 37. Each of the valve ports 33, 34, 35, 36, 37 protrudes outward from the sidewall 21 along a radius of the rotational axis 16 and communicates with a corresponding subchamber 32. The valve ports 33, 34, 35, 36, 37 extend within a common second plane 41 (FIG. 9) that is perpendicular to the rotational axis 16 and intersects the sidewall 21 at an axial location between the first plane 40 and the sidewall base end 22.

In the illustrated embodiment, the valve ports 33, 34, 35, 36, 37 are cylindrical tubes, and each valve port 33, 34, 35, 36, 37 forms a circular opening at the intersection with the valve body sidewall 21. Although, as illustrated, the valve ports 33, 34, 35, 36, 37 each have the same length, cross-sectional shape and dimensions, the valve ports 33, 34, 35, 36, 37 are not limited to this configuration. Moreover, the valve ports 33, 34, 35, 36, 37 are not limited to the illustrated co-planar and radially oriented configuration. For example, in other embodiments, one or more of the valve ports 33, 34, 35, 36, 37 may be non-co-planar with the other valve ports and/or may protrude from the base rather than the sidewall. The valve polls 33, 34, 35, 36, 37 may protrude in a direction that is parallel to the rotational axis 16, in a direction that is perpendicular to the rotational axis 16 or at any angle between perpendicular and parallel to the rotational axis 16. The valve ports 33, 34, 35, 36, 37 may protrude non-radially; an axis of a given valve port is not required to intersect the rotational axis 16. In many applications, the configuration of the valve ports 33, 34, 35, 36, 37 is determined by packaging requirements.

The valve polls 33, 34, 35, 36, 37, are provided at spaced-apart locations about a circumference of the sidewall 21. In the illustrated embodiment, the first and fourth valve ports 33, 36 are disposed on opposed sides of the valve body 20, extend in parallel to a common diameter of the valve body 20. The fifth valve port 37 is disposed midway between the first and fourth valve ports 33, 36. The second and third valve ports 34, 35 are on the opposite side of the valve body 20 relative to the fifth valve port 37. In other embodiments, the valve ports 33, 34, 35, 36, 37 may have a different spacing than shown, as determined by the specific application.

Figure 7:
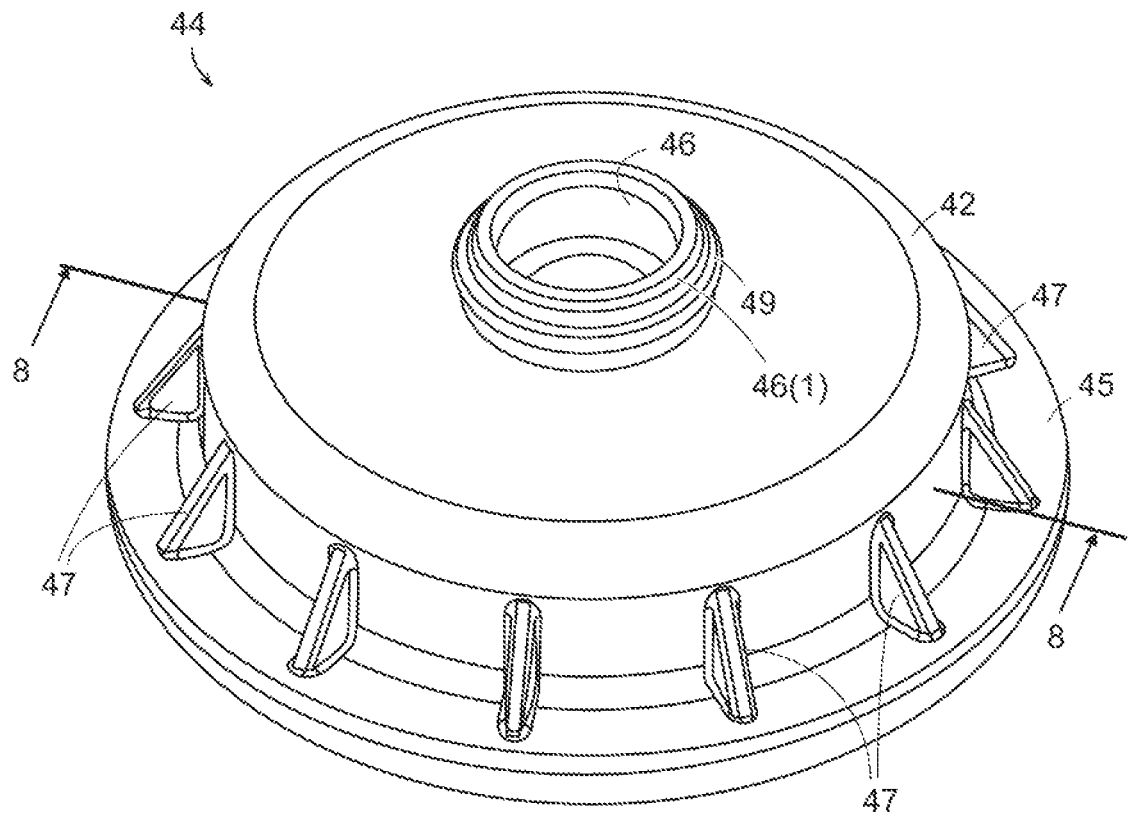
FIG. 7 is a top perspective view of the lid.
Figure 8:
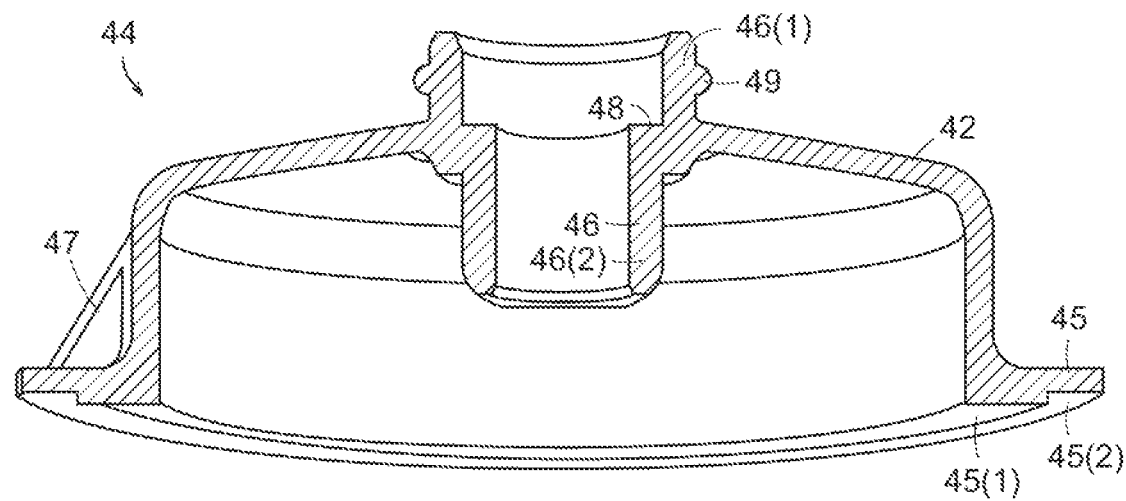
FIG. 8 is a cross-sectional view of the lid as seen along line 8-8 of FIG. 7.

Referring to FIGS. 7 and 8, the rotary disc valve 18 includes the lid 44 that closes the open end of the valve body 20. The lid 44 is generally bowl shaped and includes a central concave portion 42 and a lip 45 that protrudes radially outward from a periphery of the concave portion 42. The concave portion 42 opens facing the valve body 20 and has a diameter that is less than a diameter of the sidewall 21. A peripheral edge of the lid 44 includes a lip 45. The lip 45 protrudes outward in a direction perpendicular to the rotational axis 16. The lip 45 has a non-uniform thickness. In particular, the radially inward portion 45(1) of the lip 45 has a thickness that is greater than a thickness of the radially outward portion 45(2). When assembled with the valve body 20, the radially outward portion 45(2) abuts the sidewall open end 23, and the radially inward portion 45(1) is axially aligned with, and contacts, a flange 79 of the diverter 60. In the illustrated embodiment, the lid 44 includes gussets 47 that extend between an outer surface of the concave portion 42 and the lip 45. The gussets 47 structurally reinforce the lid 44, particularly with respect to the position of the lip 45 relative to the concave portion 42. The gussets 47 are generally triangular in shape and are spaced apart along a circumference of the concave portion 42.

The lid 44 includes an integral cylindrical sleeve 46 that is coaxial with the rotational axis 16 and extends from both the inner and outer surfaces of the lid 44. The sleeve 46 has a non-uniform inner diameter, and a shoulder 48 is disposed at the transition between a larger-diameter portion 46(1) and a smaller-diameter portion 46(2). The larger diameter portion 46(1) resides outside the lid 44, whereas the smaller diameter portion 46(2) is substantially disposed on the inside of the lid 44. The larger diameter portion 46(1) has an inner diameter that is dimensioned to receive the valve shaft 64 in a clearance fit, for example a running fit, whereby the smaller diameter portion 46(2) serves as a bushing of the valve shaft 64. The larger diameter portion 46(1) includes an annular flange 49 that protrudes radially outward from an outer surface of the sleeve large diameter portion 46(1). The flange 49 may extend continuously about the entire outer circumference of the sleeve 46 and is axially offset relative to the shoulder 48.

Figure 9:
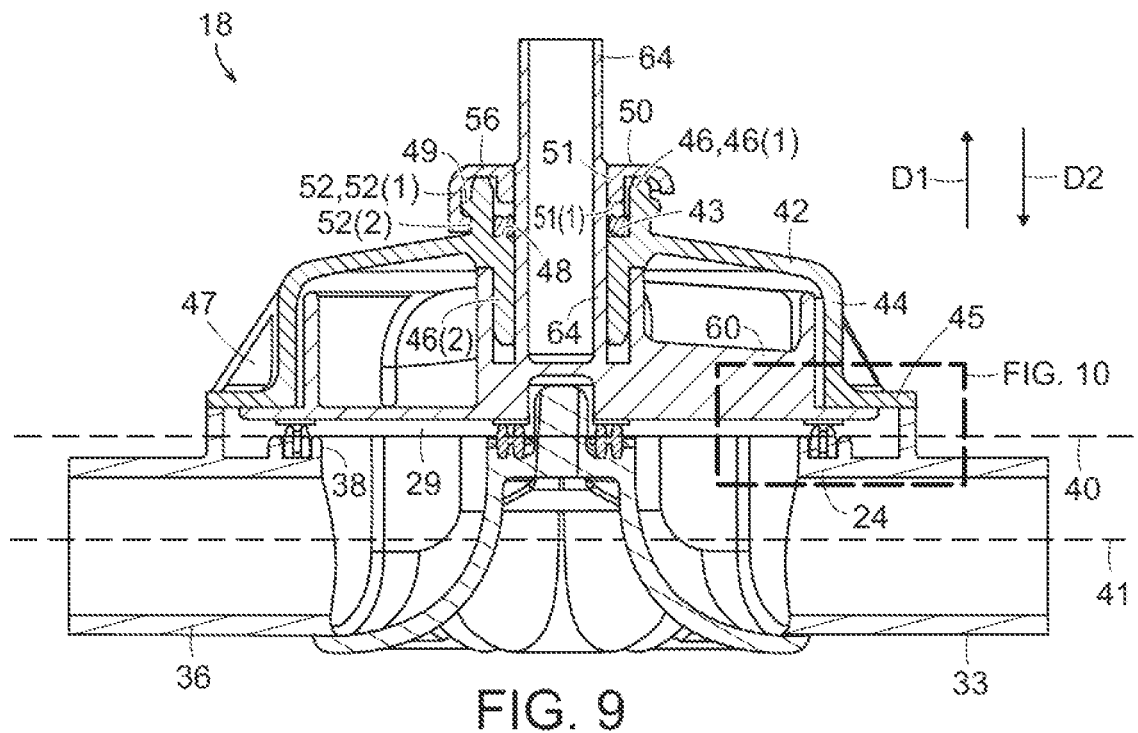
FIG. 9 is a cross-sectional view of the rotary disc valve as seen along line 9-9 of FIG. 2.

Referring to FIGS. 2-3 and 9, a shaft seal 43 is disposed between the valve shaft 64 and the sleeve large diameter portion 46(1). The shaft seal 43 provides a fluid seal between the valve shaft 64 and the sleeve 46. The shaft seal 43 is annular and may be formed of an elastomer that is compatible with automotive coolant, such as ethylene propylene diene monomer (EPDM). In the illustrated embodiment, the shaft seal 43 is an O-ring having an "X" cross-sectional shape. In other embodiments, the shaft seal 43 may have other cross-sectional shapes, such as, but not limited to, rectangular, oval or "I" shapes.

The shaft seal 43 is retained on the valve shaft 64 at an axial location corresponding to the sleeve large diameter portion 46(1) via a retaining cap 50. The retaining cap 50 includes an end plate 56 that surrounds the valve shaft 64, a collar 51 that protrudes from an inner periphery of the end plate 56 and latches 52 that protrude from an outer periphery of the end plate 56. The end plate 56, in use, is generally perpendicular to the rotational axis 16. The end plate 56 a circular profile when viewed in a direction parallel to the rotational axis 16. The end plate 56 has a central opening 59 that receives the valve shaft 64.

The collar 51 extends continuously along the end plate inner periphery and protrudes inward from the endplate inner surface. In use, the collar 51 resides between the sleeve 46 and the valve shaft 64 such that an end face 51(1) of the collar 51 faces the shoulder 48 with the shaft seal 43 disposed between the collar end face 51(1) and shoulder 48.

The latches 52 are spaced apart along the outer periphery of the end plate and protrude inward from the endplate inner surface toward the lid 44. In the illustrated embodiment, the retaining cap 50 includes three latches 52 that are equally spaced apart along the end plate outer periphery. Each latch 52 includes a leg portion 52(1) and a hook portion 52(2). A proximal end of the leg portion 52(1) is integral with the end plate 56, and the leg portion 52(1) extends in parallel to the rotational axis 16. An axial dimension of the leg portion 52(1) is sufficient to position the distal end of the leg portion 52(1) at a location corresponding to the flange 49 that protrudes radially outward from an outer surface of the sleeve large diameter portion 46(1). The hook portion 52(2) is disposed at the distal end of the leg portion 52(1) and protrudes radially toward the valve shaft 64. The hook portion 52(2) is axially offset relative to the end face 51(1) of the collar 51 and forms an interference or snap-fit engagement with the flange 49. By this configuration, the retaining cap 50 is retained on the lid 44, with the shaft seal 43 trapped between the end face 51(1) of the collar 51 and the shoulder 48. As a result, the shaft seal 43 is retained on the valve shaft 64 via the retaining cap 50.

Referring to FIGS. 3, 9 and 11-13, the diverter 60 is disposed in the valve chamber 29 between the platform 24 and the lid 44 and is rotatable relative to the valve body 20 about the rotational axis 16. The diverter 60 is generally disc shaped, and includes a diverter sealing surface 61 that faces toward the base 26, and a diverter outer surface 62 that is opposed to the diverter sealing surface 61 and faces away from the base 26. The diverter sealing surface 61 is planar (e.g., flat or level and smooth, without raised areas, protrusions, recesses, indentations or surface features or irregularities). The diverter sealing surface 61 faces and directly contacts a corresponding flat surface 81 of the seal assembly 80, as discussed in detail below.

The diverter 60 includes a valve shaft 64 that protrudes from the center of the diverter outer surface 62 in a direction perpendicular to the diverter sealing surface 61. The valve shaft 64 is configured to be connected to an output shaft of the valve actuator, which drives the valve shaft 64 to rotate about the rotational axis 16, which coincides with a longitudinal centerline of the valve shaft 64. In the illustrated embodiment, the outer surface of the valve shaft 64 may include flats (shown), splines or other features that permit engagement with an output structure of the valve actuator.

Figure 12:
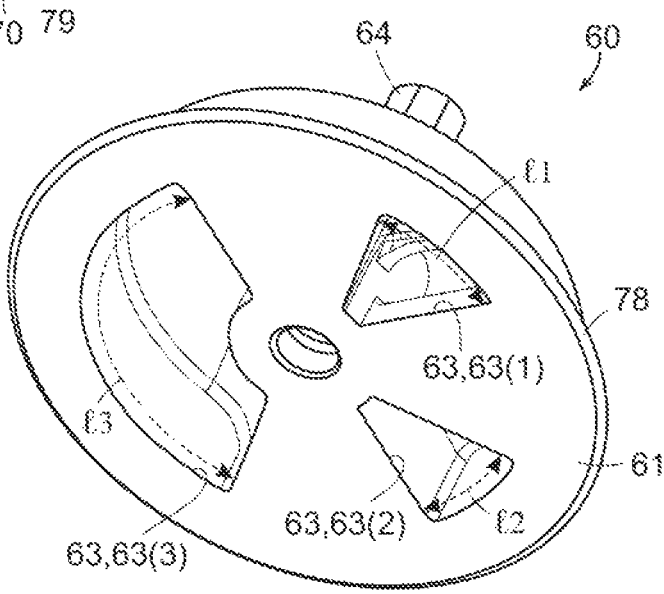
FIG. 12 is a bottom perspective view of the diverter.
Figure 13:
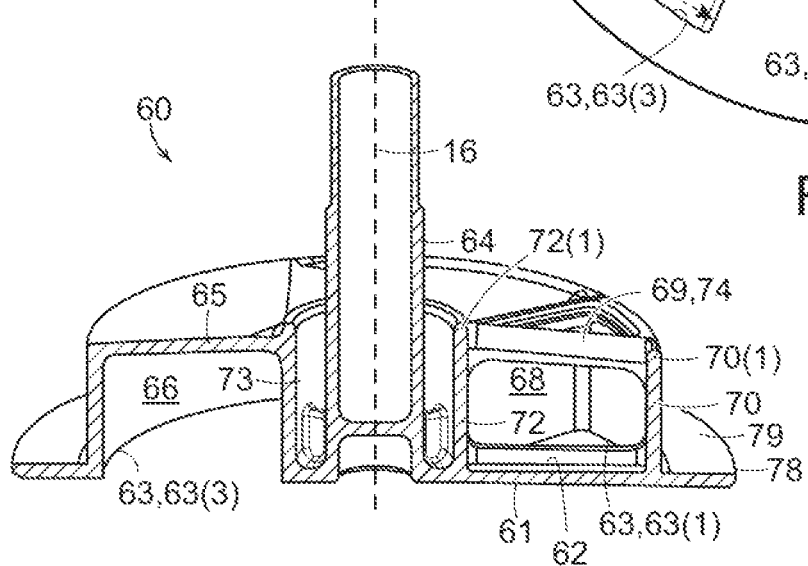
FIG. 13 is a cross-sectional view of the diverter as seen along line 13-13 of FIG. 11.
Figure 14:
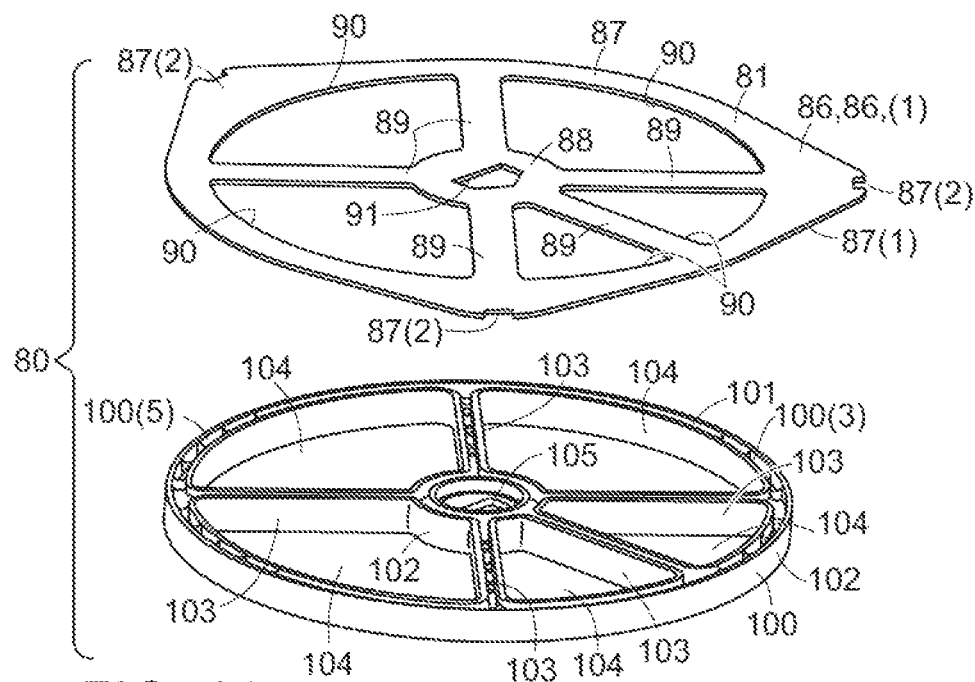
FIG. 14 is an exploded view of the seal assembly.
Figure 15:
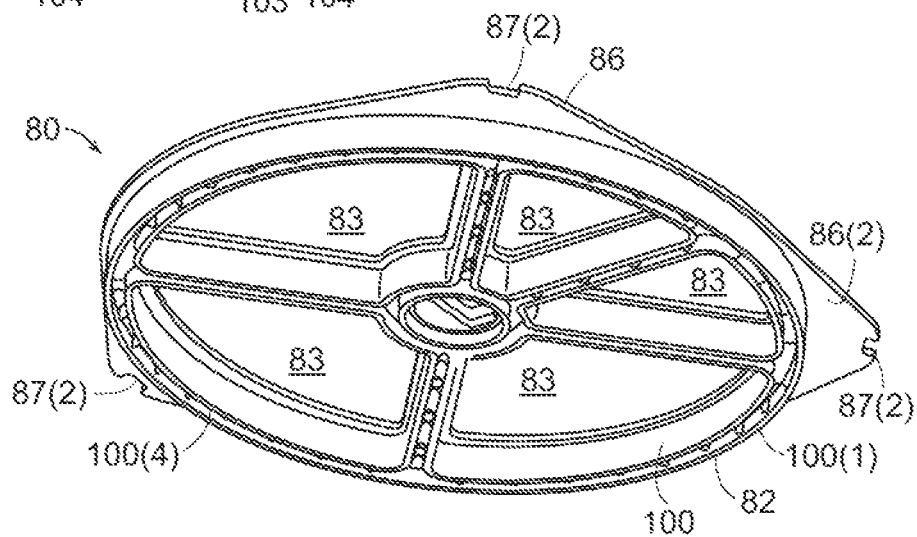
FIG. 15 is a bottom perspective view of the seal assembly.
Figure 16:
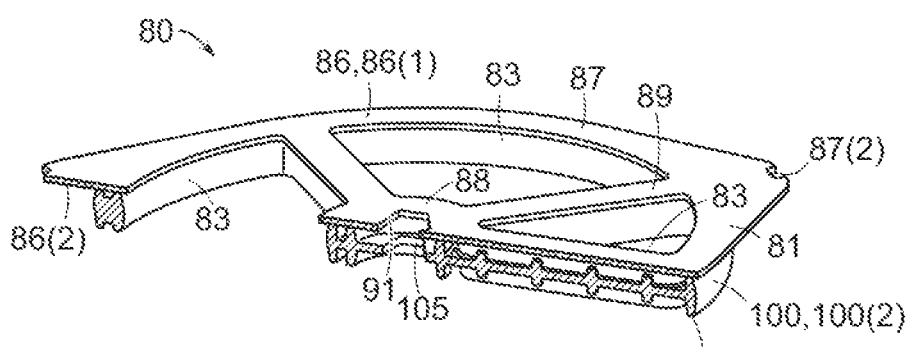
FIG. 16 is a cross-sectional view of the seal assembly.
Figure 17:
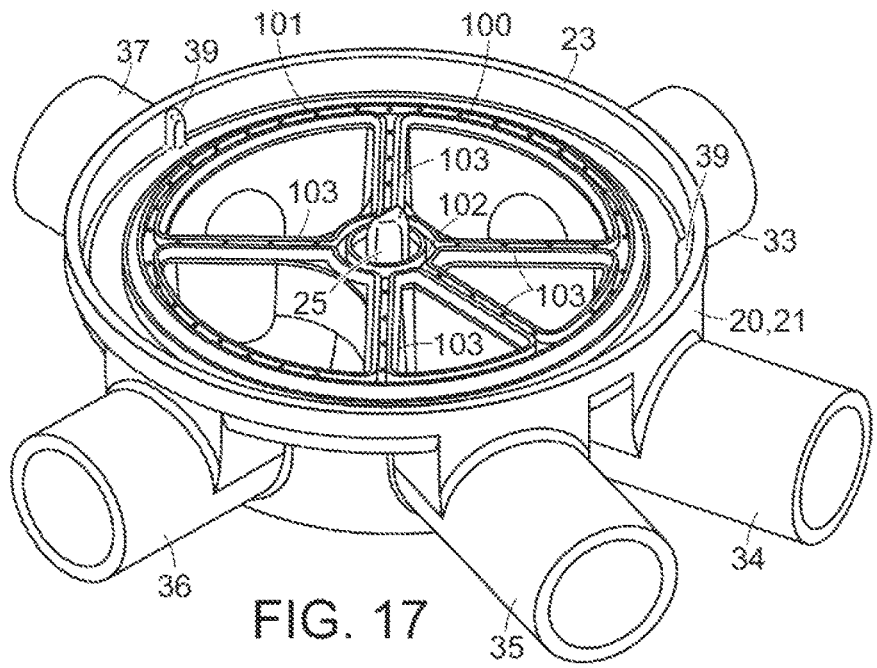
FIG. 17 is a top perspective view of the valve body with the elastic element disposed in the valve chamber.
Figure 18:
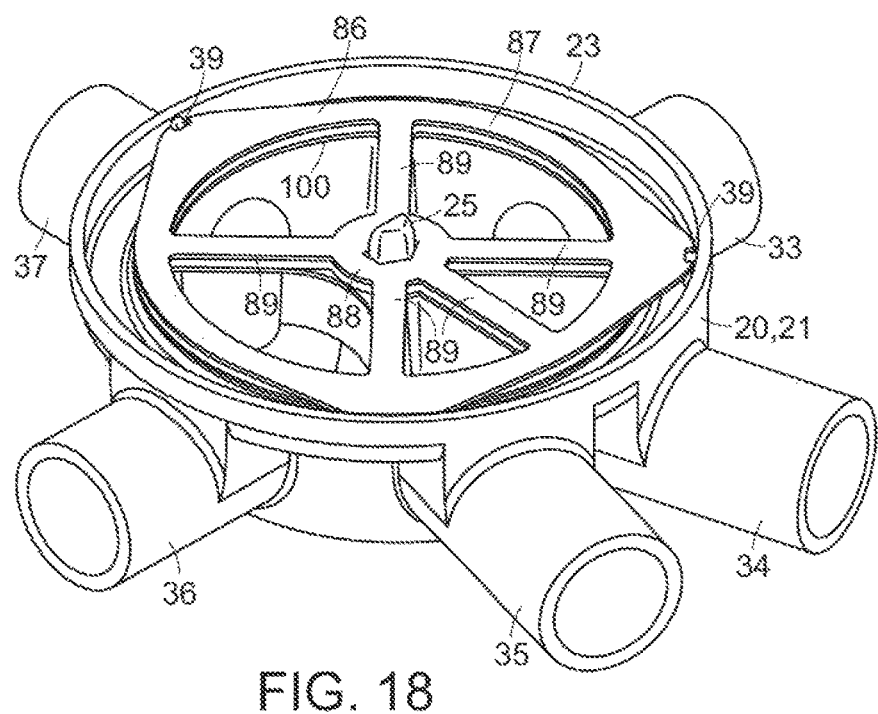
FIG. 18 is a top perspective view of the valve body with the elastic element and seal plate disposed in the valve chamber.

The diverter 60 includes diverter through openings 63 having a circular sector-shaped profile when the diverter 60 is viewed in a direction parallel to the rotational axis 16. The diverter through openings 63 extend between the diverter sealing surface 61 and the diverter outer surface 62, whereby fluid enters and exits the diverter 60 in a direction that is parallel to the rotational axis 16. In the illustrated embodiment, the diverter 60 includes three diverter through openings 63(1), 63(2) and 63(3) that are spaced apart from each other. The first and second diverter through openings 63(1), 63(2) have a small arc length as compared to that of the third diverter through opening 63(3). For example, in the illustrated embodiment, the first and second diverter through openings 63(1), 63(2) have an arc length C1, C2 in a range of 30 degrees to 60 degrees and the third diverter through opening 63(3) has an arc length C3 in a range of 60 degrees to 120 degrees (FIG. 12).

The diverter 60 includes a dome 65 that protrudes from the diverter outer surface 62 and overlies the third diverter through opening 63(3). In particular, the dome 65 encloses a portion of a periphery of the third diverter through opening 63(3) whereby, for certain rotational positions of the diverter 60 relative to the valve body 20, fluid entering the third diverter through opening 63(3) from one valve body subchamber 32 may be redirected to an adjacent valve body subchamber 32. Thus, the dome 65 provides a "closed" first fluid passageway 66 within the rotary disc valve 18.

The first and second diverter through openings 63(1), 63(2) are not enclosed by a dome, and fluid entering one of the first and second diverter through openings 63(1), 63(2) from a respective subchamber 32 is constrained by the valve body 20 and the lid 44 and redirected toward the other of the first and second diverter through openings 63(1), 63(2). For example, after entering the diverter via the first diverter through opening 63(1), and before exiting the diverter 60 via the second diverter through opening 63(2), fluid passes over a portion the diverter outer surface 62. In other words, for certain rotational positions of the diverter 60 relative to the valve body 20, fluid entering the first diverter through opening 63(1) from a corresponding first valve body subchamber 32 may be redirected to a second valve body subchamber 32 via an "open" second fluid passageway 68 within the rotary disc valve 18, the second fluid passageway 68 passing over the diverter outer surface 62.

It is understood that the size and spacing of the first, second and third diverter through openings 63(1), 63(2), 63(3), as well as the shape and size of the dome 65, are exemplary and in practice will depend on the specific application.

In the illustrated embodiment, the diverter 60 is formed of a plastic such as Polyoxymethylene (POM), Polyphenylene Sulfide (PPS) or Polypropylene (PP). To provide increased structural integrity, including resistance to bending or flexion of the diverter 60, the diverter 60 may include a stiffening superstructure 69. In the illustrated embodiment, the superstructure 69 includes an annular outer rim 70, an annular inner rim 72 and spokes 74 that extend between the outer rim 70 and the inner rim 72. The outer rim 70 protrudes axially outward from the diverter outer surface 62 and is disposed at a location that is radially outward relative to the first, second and third diverter through openings 63(1), 63(2), 63(3). The outer rim 70 is spaced apart from a peripheral edge 78 of the diverter 60, and the portion of the diverter 60 between the outer rim 70 and the peripheral edge 78 is referred to as the diverter flange 79. The diverter sealing and outer surfaces 61, 62 extend to the peripheral edge 78 of the diverter, and thus form part of the diverter flange 79. In the illustrated embodiment, the outer rim 70 provides a portion of the dome 65 that encloses the third diverter through opening 63(3).

The inner rim 72 is surrounded by the outer rim 70 and protrudes axially outward from the diverter outer surface 62 an axial distance that is slightly greater than that of the outer rim 70. The inner rim 72 closely surrounds the valve shaft 64, whereby it is disposed at a location that is radially inward relative to the first, second and third diverter through openings 63(1), 63(2), 63(3). An annular groove 73 is disposed between the inner rim 72 and the valve shaft 64.

The spokes 74 extend between free ends 70(1), 72(1) of the outer and inner rims 70, 72, contributing to the stiffening effect of the superstructure 69. In the illustrated embodiment, the diverter 60 has four spokes 74(1), 74(2), 74(3), 74(4), including a first pair 74(1), 74(2) of spokes 74 that overlie the radii that define the circular sector-shape of the first diverter through opening 63(1), and a second pair 74(3), 74(4) of spokes 74 that overlie the radii that define the circular sector-shape of the second diverter through opening 63(2). In addition, a first partition wall 75 extends between the outer and inner rims 70, 72 at a location corresponding to the first spoke 74(1), and a second partition wall 76 extends between the outer and inner rims 70, 72 at a location corresponding to the fourth spoke 74(4). The partition walls 75, 76 retain fluid within the second fluid passageway 68 and direct fluid into the adjacent first or second diverter through opening 63(1), 63(2). In addition, the partition walls 75, 76 form part, and enhance the stiffening effect, of the superstructure 69.

Referring to FIGS. 3 and 14-16, the seal assembly 80 is disposed in the valve chamber 29 between the diverter sealing surface 61 and the base 26 of the valve body 20, more particularly between the diverter sealing surface 61 and the platform 24. The seal assembly 80 includes a seal sealing surface 81 that faces toward, and directly contacts, the diverter sealing surface 61, and a seal outer surface 82 that is opposed to the seal sealing surface 81 and faces toward the base 26. In addition, the seal assembly 80 includes seal through openings 83 that extend between the seal sealing surface 81 and the seal outer surface 82. In certain rotational positions of the diverter 60, a subset of seal through openings 83 are aligned with one or more of the diverter through openings 63. The seal assembly 80 is fixed relative to the valve body 20 and prevents fluid flow between the diverter 60 and the valve body 20, and between abutting portions of the diverter sealing surface 61 and the seal sealing surface 81.

The seal assembly 80 is an assembly of two sealing elements. The first sealing element, referred to as the seal plate 86, is disposed between the diverter 60 and the base 26. The second sealing element, referred to as the elastic element 100, is disposed between the seal plate 86 and the base 26. The seal plate 86 is stacked with the elastic element 100 in a direction parallel to the rotational axis 16.

The seal plate 86 includes a plate outer annular portion 87, a plate inner annular portion 88, and plate struts 89 that extend between the plate outer annular portion 87 and the plate inner annular portion 88, giving the seal plate 86 the appearance of a spoked wheel when viewed in a direction parallel to the rotation axis 16. The seal plate 86 has plate through openings 90, which are defined between the plate outer and inner annular portions 87, 88 and each pair of adjacent plate struts 89. By this configuration, the plate through openings 90 are each generally circular sector shaped. The plate struts 89 are not equidistantly spaced, whereby the respective plate through openings 90 do not each have the same arc length.

The plate inner annular portion 88 has a central opening 91 having a cross-sectional shape and dimension corresponding to the cross-sectional shape and dimension of the valve body post 25. In the illustrated embodiment, the central opening 91 has a pentagonal shape and receives the post 25 in a clearance fit, for example a location fit, whereby the seal plate 86 can be assembled with the valve body 20 in a predetermined orientation.

The plate outer annular portion 87 has a plate peripheral surface 87(1) that faces the sidewall 21. Rectangular notches 87(2) are provided in the plate peripheral surface 87(1). The notches 87(2) are spaced apart along the circumference of the plate outer annular portion 87 and open facing the sidewall 21. The notches 87(2) are shaped and dimensioned to receive the sidewall ribs 39 in a clearance fit, for example a location fit. The sidewall ribs 39 engage the notches 87(2), whereby the seal plate 86 is prevented from rotating relative to the valve body 20. In the illustrated embodiment, the plate peripheral surface 87(1) is generally circular, and slightly protrudes radially outward in the vicinity of the notches 87(2).

The diverter-facing surface 86(1) of the seal plate 86 and the base-facing surface 86(2) of the seal plate 86 are planar (e.g., flat or level and smooth, without raised areas, protrusions, recesses, indentations or surface features or irregularities). The diverter-facing surface 86(1) provides the seal sealing surface 81 of the seal assembly 80. In particular, the diverter-facing surface 86(1) faces toward, and directly contacts, the diverter sealing surface 61. Since the diverter 60 rotates relative to the seal plate 86 dining valve use, the seal plate 86 is rigid, and is formed of a highly wear resistive plastic. In some embodiments, for example, the seal plate 86 is an ultra-high molecular weight polyethylene. In other embodiments, the seal plate 86 may be formed of other plastics such as Polytetrafluoroethylene (PTFE).

The seal plate 86 is a thin plate in that the axial dimension, or thickness, of the seal plate 86 is much less than the dimension of the seal plate 86 in a direction perpendicular to the axial dimension (e.g., much less than the diameter of the seal plate 86). For example, in the illustrated embodiment, the diameter of the seal plate 86 may be in a range of 10 times the seal plate thickness to 40 times the seal plate thickness.

The elastic element 100 includes an element outer annular portion 101, an element inner annular portion 102, and element struts 103 that extend between the element outer annular portion 101 and the element inner annular portion 102, giving the elastic element 100 the appearance of a spoked wheel when viewed in a direction parallel to the rotation axis 16. The elastic element 100 has element through openings 104, which are defined between the element outer and inner annular portions 101, 102 and each pair of adjacent element struts 103. By this configuration, the element through openings 104 are each generally circular sector shaped. The element struts 103 are not equidistantly spaced, whereby the respective element through openings 104 do not each have the same arc length. The element through openings 104 are aligned with corresponding ones of the seal plate through openings 90, and each element through opening 104 has the same shape and dimension as the seal plate through opening 90 with which it is aligned. By this configuration, the plate and element through openings 90, 104 provide the seal through openings 83 of the seal assembly 80.

The element inner annular portion 102 has a central opening 105 having a cross-sectional shape and dimension corresponding to the cross-sectional shape and dimension of the valve body post 25. In the illustrated embodiment, the central opening 105 has a pentagonal shape and receives the post 25 in a clearance fit, for example a location fit, whereby the elastic element 100 can be assembled with the valve body 20 in a predetermined orientation.

The base-facing surface 100(1) of the elastic element 100 provides the seal outer surface 82 of the seal assembly 80, and the base-facing surface 100(1) faces toward, and directly contacts, the platform 24. More particularly, the elastic element 100 rests in the platform channel 28 which is shaped and dimensioned to receive the elastic element base-facing surface 100(1) and peripheral edges 100(2) in a clearance fit, for example a sliding fit. The engagement between the elastic element peripheral edges 100(2) and surfaces of the platform channel 28 serves to prevent relative rotation of the elastic element 100 relative to the valve body 20. Thus, both the elastic element 100 and the seal plate 86 are fixed relative to the valve body 20.

The elastic element 100 has a greater elasticity than the seal plate 86. In addition, the elastic element 100 is formed of an elastic material that is compatible with the fluid that flows through the rotary disc valve 18 and meets the requirements for operating temperature and durability. For example, when the rotary disc valve 18 is used to control fluid in a vehicle coolant system, the elastic element 100 is formed of an elastomer that is compatible with automotive coolant, such as ethylene propylene diene monomer (EPDM).

In addition to material selection, the softness and resilience of the elastic element 100 may be further increased and/or optimized by providing the element outer and inner annular portions 101, 102 and the element struts 103 with an irregular cross-sectional shape. For example, in some embodiments, the element outer and inner annular portions 101, 102 and the element struts 103 may include a non-circular and non-rectangular cross-sectional shape. In the illustrated embodiment, the base-facing surface 100(1) of the elastic element 100 includes a first groove 100(4) that extends along each of the element outer and inner annular portions 101, 102 and the element struts 103. In addition, the lid-facing surface 100(3) of the elastic element 100 includes a second groove 100(5) that extends along each of the element outer and inner annular portions 101, 102 and the element struts 103. As a result, the element outer annular portion 101, the element inner annular portion 102, and the element struts 103 of the elastic element 100 each have an H shaped cross-section.

The elastic element 100 is thin in that the axial dimension, or thickness, of the elastic element 100 is much less than the dimension of the elastic element 100 in a direction perpendicular to the axial dimension (e.g., much less than the diameter of the elastic element 100). For example, in the illustrated embodiment, the diameter of the elastic element 100 may be in a range of 7 times the elastic element thickness to 20 times the elastic element thickness. In addition, the diameter of the elastic element 100 is slightly less than a diameter of the seal plate 86, and a diameter of the diverter sealing surface 61 is the same as the diameter of the seal sealing surface 81 (e.g. the same as the diverter-facing surface 86(1) of seal plate 86).

Figure 10:
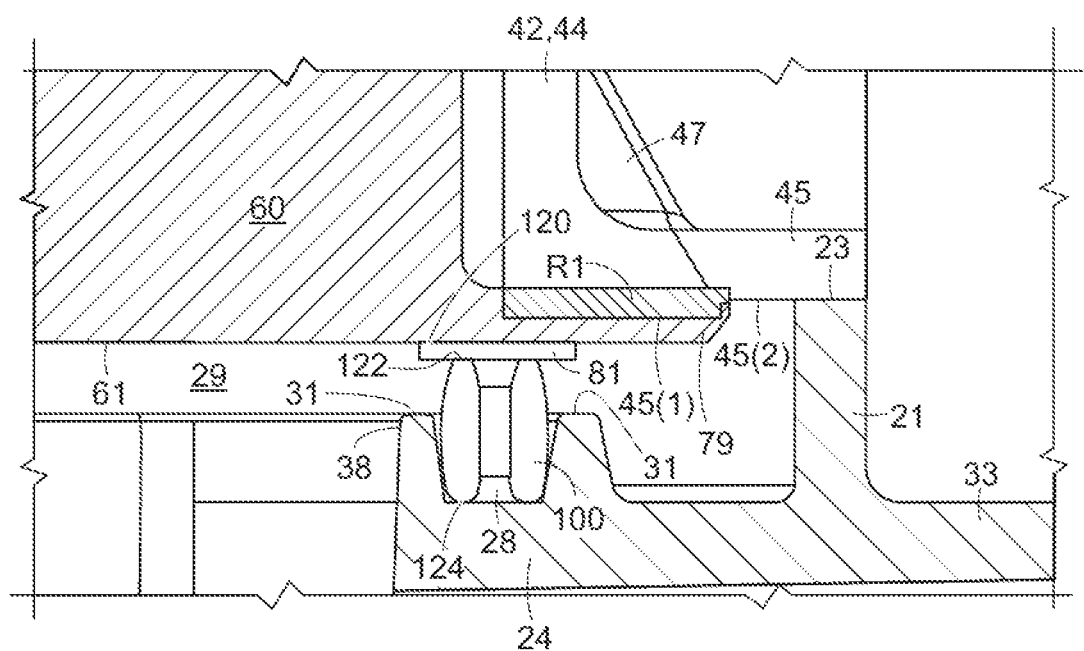
FIG. 10 is an enlargement of the portion of FIG. 9 indicated in broken lines.
Figure 11:
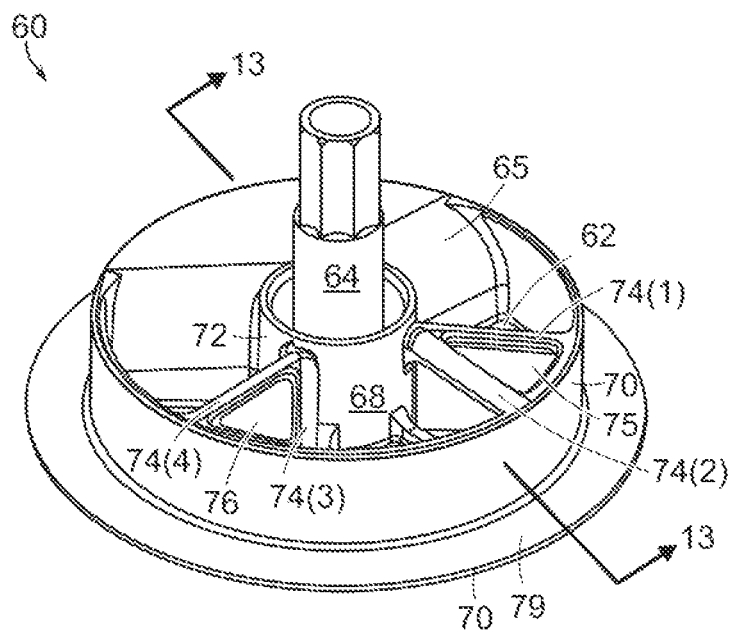
FIG. 11 is a top perspective view of the diverter.

Referring to FIG. 10, the valve body 20, the lid 44 and the diverter 60 are shaped and dimensioned so that an interference fit exists between the lid 44 and the diverter 60 that results in compression of the seal assembly between the diverter 60 and the valve body base 26. In particular, the interference fit occurs between facing surfaces of the lip inward portion 45(1) and the diverter flange 79. In FIG. 10, the interference is represented by showing an overlap (see finely cross-hatched region R1) of the lip inward portion 45(1) and the diverter flange 79. As a result of the interference, au axial load is applied to the diverter, and the axial load results in compression of the seal assembly 80 between the diverter 60 and the base 26. In the illustrated embodiment, the rotary disc valve 18 is free of a compression spring between the lid 44 and the diverter 60, whereby the sealing force is provided by the axial load resulting from the interference fit.

As a result of the axial load, a fluid-tight seal 120 between the diverter sealing surface 61 and the diverter-facing surface 86(1) of the seal plate 86 is achieved, even during relative motion between the diverter 60 and the seal plate 86. This seal 120 between relatively moving parts is referred to as a "dynamic seal" In addition, the relatively soft and resilient elastic element 100 permits the seal assembly 80 to adapt to the changes in dimension caused by changes in temperature and due to wear of the diverter 60 and seal plate 86. Since the seal plate 86 is compressed against the elastic element 100 via the axial load, a fluid-tight first static seal 122 exists between surfaces of the seal plate 86 and surfaces of the elastic element 100 having direct contact, and a fluid-tight second static seal 124 exists between surfaces of the elastic element 100 and surfaces of the valve body 20 having direct contact. The term "static seal" is used herein to refer to a seal between relatively fixed parts.

In the embodiment of the rotary disc valve 18 described above, the diverter 60 is disposed on a first side of the seal assembly 80 and the valve ports 33, 34, 35, 36, 37 are disposed on a second, opposed side of the seal assembly 80. In addition, the diverter 60 is configured to control fluid flow through the valve body 20 in such a way that fluid enters the diverter 60 in a first direction D1 (FIG. 9) that is parallel to the rotational axis 16. For example, fluid may enter a valve port 33, pass through a corresponding valve subchamber 32, pass through a corresponding seal through opening 83 and enter a corresponding diverter through opening 63. Within the diverter 60, fluid enters the diverter through opening 63 at the diverter sealing surface 61 and exits the diverter through opening at the diverter outer surface 62. Depending on the diverter through opening 63 and the rotational position of the diverter 60 relative to the valve body 20, the fluid may then pass through either the first (closed) fluid passageway 66 or the second (open) fluid passageway 68 to another diverter through opening 63. This diverter fluid opening 63 directs fluid toward another seal through opening 83 and its corresponding subchamber 32, whereby fluid exits the diverter 60 in a second direction D2 (FIG. 9) that is parallel to the rotational axis 16, the second direction being opposite the first direction. By this configuration, between entering and exiting the diverter 60, fluid flows over a portion of the diverter outer surface 62 via the first fluid passage 66 and/or the second fluid passage 68.

In the above described rotary disc valve 18, the seal assembly 80, including both the elastic element 100 and the seal plate 86, is fixed relative to the valve body 20. However, the rotary disc valve 18 is not limited to a configuration in which the seal assembly 80 is fixed relative to the valve body 20. For example, the rotary disc valve 18 may have an alternative configuration in which the seal assembly 80 is mounted in the diverter 60 and rotates with the diverter, such as is described in the co-pending U.S. patent application having U.S. Ser. No. 17/342,042, the contents of which is incorporated by reference herein.

In the above described rotary disc valve 18, the diverter 60 and seal assembly 80 may be plastic components. In some operating conditions, for example where the fluid passing through the valve includes debris such as sand particles, it may be advantageous to form the dynamic seal using ceramic components or components formed of other appropriate wear-resistant materials, such as aluminum or steel, to provide a fluid tight seal having increased durability.

Figure 19:
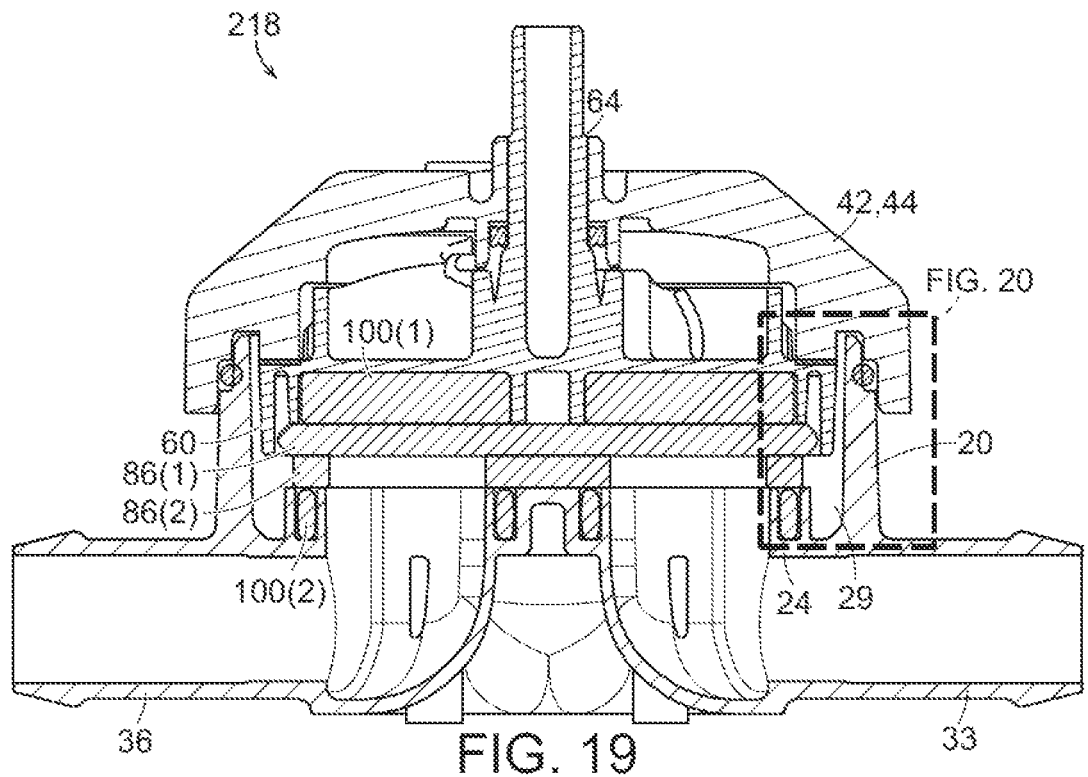
FIG. 19 is a cross-sectional view of an alternative embodiment rotary disc valve.
Figure 20:
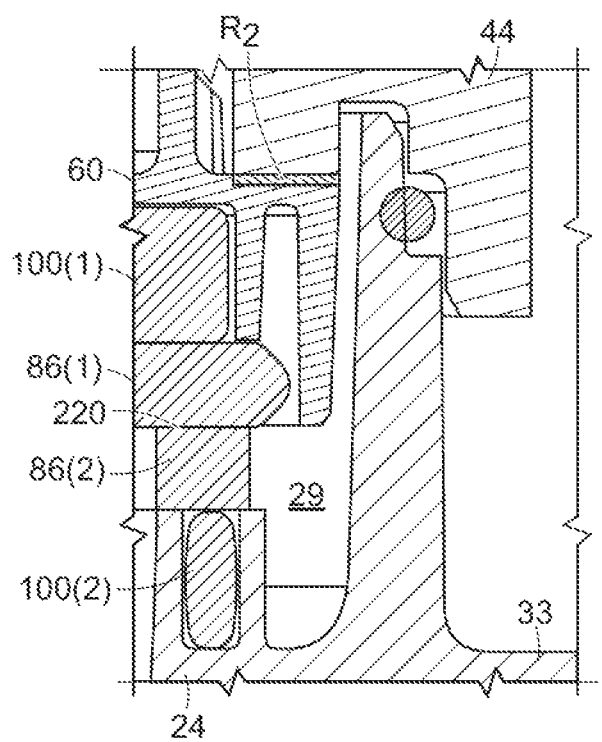
FIG. 20 is an enlargement of the portion of FIG. 19 indicated in broken lines.

Referring to FIGS. 19 and 20, an alternative embodiment rotary disc valve 218 is similar to the rotary disc valve 18 described above, and common reference numbers are used to refer to common elements. The alternative embodiment rotary disc valve 218 differs from the earlier embodiment since it includes an alternative embodiment seal assembly 280. The alternative embodiment seal assembly 280 includes a first seal subassembly 280(1) that is disposed on the diverter sealing surface 61 and is fixed relative to the diverter 60. In addition, the alternative embodiment seal assembly 280 includes a second seal subassembly 280(2) that is disposed on the platform 24 of the base 26 and is fixed relative to the base 26. The first and second seal subassemblies 280(1), 280(2) are in a stacked (e.g., layered) configuration in a direction parallel to the rotational axis 16. Each of the first and second seal subassemblies 280(1), 280(2) include a seal plate 86 and an elastic element 100 that is stacked with the seal plate 86 in a direction parallel to the rotational axis 16. In the first seal subassembly 280(1), the first elastic element 100(1) abuts the diverter sealing surface 61, and the first seal plate 86(1) is disposed between the first elastic element 100(1) and the second seal subassembly 280(2). In the second seal subassembly 280(2), the second seal plate 86(2) abuts the first seal plate 86(1), and the second elastic element 100(2) is supported on the platform 24. By this arrangement, the second elastic element 100(2) is disposed between the second seal plate 86(2) and the base 26. In this configuration, the first elastic element 100(1) forms a static, fluid-tight seal with the diverter 60, and the second elastic element 100(2) forms a static, fluid tight seal with the platform 24 of the valve body 20. When the diverter 60 rotates within the valve body 20, the first seal plate 100(1) rotates in concert with the diverter 60 relative to the second seal plate 100(2), which is fixed relative to the base 26.

In the rotary disc valve 218 of FIGS. 19 and 20, the valve body 20, the lid 44 and the diverter 60 are shaped and dimensioned so that an interference fit exists between the lid 44 and the diverter 60 that results in compression of the seal assembly 280 between the diverter 60 and the valve body base 26. In FIG. 20, the interference is represented by showing an overlap (see finely cross-hatched region R2) of the lid 44 and the diverter 60. As a result of the interference, an axial load is applied to the diverter 60, and the axial load results in compression of the seal assembly 280 between the diverter 60 and the base 26. In the illustrated embodiment, the rotary disc valve 218 is free of a compression spring between the lid 44 and the diverter 60, whereby the sealing force is provided by the axial load resulting from the interference fit.

As a result of the axial load, a fluid-tight seal 220 is achieved between the first seal plate 100(1) and the second seal plate 100(2), even dining relative motion between the diverter 60 and the base 26. This seal 220 is a "dynamic seal." In addition, the relatively soft and resilient elastic elements 100(1), 100(2) permit the seal assembly 280 to adapt to the changes in dimension caused by changes in temperature and due to wear of the diverter 60 and the seal plates 86(1), 86(2).

In rotary disc valve illustrated in FIGS. 1-18, the elastic element 100 has been described and/or shown as having an H-shaped cross-section. However, it is understood that other cross-sectional shapes may be employed to optimize the material properties of the elastic element 100 for a given application. For example, in some embodiments, an alternative elastic element 100 may be formed with the surface grooves 100(4), 100(5) omitted, whereby the elastic element 100 may have an oval (as shown in FIGS. 19 and 20), circular, rectangular or other polygonal cross-sectional shape. In other embodiments, the elastic element 100 may have an irregular cross-sectional shape such as an I-shape, X-shape, etcetera.

Although the valve body 20 is described herein as including a post 25 that facilitates proper orientation of the seal assembly 80 with respect to the valve body 20, the post may be omitted in some embodiments.

Selective illustrative embodiments of the fluid delivery system including the rotary disc valve are described above in some detail. It should be understood that only structures considered necessary for clarifying the fluid delivery system and the rotary disc valve have been described herein. Other conventional structures, and those of ancillary and auxiliary components of the fluid delivery system and the rotary disc valve, are assumed to be known and understood by those skilled in the art. Moreover, while a working example of the fluid delivery system and the rotary disc valve have been described above, the fluid delivery system and the rotary disc valve are not limited to the working example described above, but various design alterations may be carried out without departing from the fluid delivery system and/or the rotary disc valve as set forth in the claims.

I claim:

1. A valve comprising:
   a valve body including
     a sidewall,
     a base that closes one end of the sidewall, and
     valve ports, each valve port defining an opening in the sidewall;
   a lid that closes an end of the sidewall that is opposite the base, the lid comprising a central opening, the lid, the sidewall and the base cooperating to define a chamber;
   a diverter disposed in the chamber, the diverter configured to control fluid flow through the valve body, the diverter including
     a diverter sealing surface that faces toward the base,
     a diverter outer surface that is opposed to the diverter sealing surface and faces the lid,
     diverter through openings that extend between the diverter sealing surface and the diverter outer surface, and
     a shaft that protrudes from the diverter outer surface in a direction perpendicular to the diverter sealing surface, the shaft extending through the central opening and configured to be connected to an actuator that drives the diverter to rotate about a rotational axis; and
   a seal assembly disposed in the chamber between the diverter sealing surface and the base,
   wherein the valve body, the lid and the diverter are shaped and dimensioned so that the lid and the diverter are in direct contact in such a way that an interference fit exists between the lid and the diverter that results in compression of the seal assembly between the diverter and the base.

2. The valve of claim 1, wherein the valve is free of an elastic element between the lid and the diverter that is configured to compress the seal assembly between the base and the diverter.

3. The valve of claim 1, wherein
   the lid includes a concave portion, and a lip that protrudes radially outward from a periphery of the concave portion, and
   a periphery of the diverter includes a diverter flange that abuts the lip in such a way as to provide the interference fit between the lid and the diverter.

4. The valve of claim 3, wherein
   the lip includes an inner portion that adjoins the concave portion, and an outer portion that includes a peripheral edge of the lid,
   the inner portion abuts the diverter flange, and
   the outer portion abuts an end of the sidewall.

5. The valve of claim 4, wherein an axial dimension of the inner portion is different than an axial dimension of the outer portion.

6. The valve of claim 1, wherein the lid includes a concave portion,
   a lip that protrudes outward from a periphery of the concave portion, and a gusset that extends between an outer surface of the concave portion and the lip.

7. The valve of claim 1, wherein the seal assembly is fixed relative to the base and prevents fluid flow between the diverter and the valve body and between abutting portions of the diverter sealing surface and the seal sealing surface.

8. The valve of claim 1, wherein
   the seal assembly comprises a first sealing element stacked with a second sealing element in a direction parallel to the rotational axis.

9. The valve of claim 1, wherein the seal assembly comprises:
   a first sealing element disposed between the diverter and the base, the first sealing element including a seal sealing surface that faces toward the diverter sealing surface, the first sealing element being a first material;
   a second sealing element disposed between the first sealing element and the base, the second sealing element including a seal outer surface that is opposed to the seal sealing surface and faces toward the base, the second sealing element being a second material; and seal through openings that extend between the seal sealing surface and the seal outer surface,
wherein
the second material has greater elasticity than the first material.

10. The valve of claim 1, wherein the diverter is configured to control id flow through the valve body in such a way that
    a) fluid enters the diverter via at least one diverter through opening in a first direction that is parallel to the rotational axis, and
    b) fluid exits the diverter via at least one diverter through opening in a second direction that is parallel to the rotational axis, the second direction being opposite the first direction.

11. The valve of claim 1, wherein the diverter is configured to control fluid flow through the valve body in such a way that, between entering and exiting, fluid flows over a portion of the diverter outer surface.

12. The valve of claim 1, wherein
the seal assembly comprises:
    a first sealing element disposed between the diverter and the base; and
    a second sealing element disposed between the first sealing element and the base, and
the valve comprises:
    a first static seal formed between the first sealing element and the second sealing element,
    a second static seal formed between the second sealing element and the base, and
    a dynamic seal formed between the first sealing element and the diverter.

13. The valve of claim 12, wherein the diverter sealing surface is a planar surface that confronts and directly contacts under axial load a planar surface of the first sealing element, thereby realizing the dynamic seal.

14. The valve of claim 1, wherein
the seal assembly comprises:
    a first seal subassembly disposed between the diverter and the base; and
    a second seal subassembly disposed between the first seal subassembly and the base, the second seal subassembly being in a stacked configuration with respect to the first seal subassembly,
the first seal subassembly comprises:
    a first elastic element disposed between the diverter and the base; and
    a first seal plate disposed between the first elastic element and the base,
the second seal subassembly comprises:
    a second seal plate disposed between the first seal subassembly and the base; and
    a second elastic element disposed between the second seal plate and the base, and
a dynamic seal is disposed between abutting surfaces of the first seal plate and the second seal plate.

15. A valve comprising:
a valve body including
    a sidewall,
    a base that closes one end of the sidewall, and
    valve ports, each valve port defining an opening in the sidewall;
a lid that closes an open end of the sidewall, the lid, the sidewall and the base cooperating to define a chamber, the lid including a concave portion, and a lip that protrudes radially outward from a periphery of the concave portion;
a diverter disposed in the chamber, the diverter configured to control fluid flow through the valve body, the diverter including
    a diverter sealing surface that faces toward the base,
    a diverter outer surface that is opposed to the diverter sealing surface and faces the lid,
    diverter through openings that extend between the diverter sealing surface and the diverter outer surface,
    a shaft that protrudes from the diverter outer surface in a direction perpendicular to the diverter sealing surface, the shaft extending through the central opening and configured to be connected to an actuator that drives the diverter to rotate about a rotational axis; and
a seal assembly disposed in the chamber between the diverter sealing surface and the base,
wherein the lip directly contacts the diverter in such a way that an axial load is applied to the diverter, and the axial load results in compression of the seal assembly between the diverter and the base.

16. The valve of claim 15, wherein
a periphery of the diverter includes a diverter flange that abuts the lip in such a way as to provide an interference fit between the lid and the diverter.

17. The valve of claim 15, wherein
the seal assembly comprises:
    a first sealing element disposed between the diverter and the base; and
    a second sealing element disposed between the first sealing element and the base, and
the valve comprises:
    a first static seal formed between the first sealing element and the second sealing element,
    a second static seal formed between the second sealing element and the base, and
    a dynamic seal formed between the first sealing element and the diverter.

18. The valve of claim 17, wherein the diverter sealing surface is a planar surface that confronts and directly contacts tinder the axial load a planar surface of the first sealing element, thereby realizing the dynamic seal.

19. The valve of claim 15, wherein
the seal assembly comprises:
    a first seal subassembly disposed between the diverter and the base; and
    a second seal subassembly disposed between the first seal subassembly and the base, the second seal subassembly being in a stacked configuration with respect to the first seal subassembly,
the first seal subassembly comprises:
    a first elastic element disposed between the diverter and the base; and
    a first seal plate disposed between the first elastic element and the base,
the second seal subassembly comprises:
    a second seal plate disposed between the first seal subassembly and the base; and
    a second elastic element disposed between the second seal plate and the base, and
a dynamic seal s disposed between abutting surfaces of the first seal plate and the second seal plate.

20. A valve comprising:
a valve body including
    a sidewall,
    a base that closes one end of the sidewall, and valve ports, each valve port defining an opening in the sidewall;

a lid that closes an end of the sidewall that is opposite the base, the lid comprising a central opening, the lid, the sidewall and the base cooperating to define a chamber;

a diverter disposed in the chamber, the diverter configured to control fluid flow through the valve body, the diverter including
- a diverter sealing surface that faces toward the base,
- a diverter outer surface that is opposed to the diverter sealing surface and faces the lid,
- diverter through openings that extend between the diverter sealing surface and the diverter outer surface, and
- a shaft that protrudes from the diverter outer surface in a direction perpendicular to the diverter sealing surface, the shaft extending through the central opening and configured to be connected to an actuator that drives the diverter to rotate about a rotational axis; and a seal assembly disposed in the chamber between the diverter sealing surface and the base, wherein the valve body, the lid and the diverter are shaped and dimensioned so that an interference fit exists between the lid and the diverter that results in compression of the seal assembly between the diverter and the base, the seal assembly comprises:
- a first seal subassembly disposed between the diverter and the base; and
- a second seal subassembly disposed between the first seal subassembly and the base, the second seal subassembly being in a stacked configuration with respect to the first seal subassembly, the first seal subassembly comprises:
- a first elastic element disposed between the diverter and the base; and
- a first seal plate disposed between the first elastic element and the base, the second seal subassembly comprises:
- a second seal plate disposed between the first seal subassembly and the base; and
- a second elastic element disposed between the second seal plate and the base, and a dynamic seal s disposed between abutting surfaces of the first seal plate and the second seal plate.

\* \* \* \* \*